US008825710B2

(12) United States Patent
Gillen et al.

(10) Patent No.: US 8,825,710 B2
(45) Date of Patent: Sep. 2, 2014

(54) CLOUD COMPUTING METHOD FOR DYNAMICALLY SCALING A PROCESS ACROSS PHYSICAL MACHINE BOUNDARIES

(75) Inventors: Robert E. Gillen, Knoxville, TN (US); Robert M. Patton, Knoxville, TN (US); Thomas E. Potok, Oak Ridge, TN (US); Carlos C. Rojas, Chicago, IL (US)

(73) Assignees: Planet Technologies, Germantown, MD (US); UT-Battelle, LLC, Oak Ridge, TN (US)

( * ) Notice: Subject to any disclaimer, the term of this patent is extended or adjusted under 35 U.S.C. 154(b) by 231 days.

(21) Appl. No.: 13/480,175

(22) Filed: May 24, 2012

(65) Prior Publication Data

US 2012/0303670 A1    Nov. 29, 2012

Related U.S. Application Data

(60) Provisional application No. 61/490,235, filed on May 26, 2011.

(51) Int. Cl.
*G06F 17/30* (2006.01)
(52) U.S. Cl.
USPC ............................ 707/797; 707/638; 707/732
(58) Field of Classification Search
CPC .............. G06F 17/227; G06F 17/2247; G06F 17/30076
USPC .......................................... 707/638, 732, 797
See application file for complete search history.

(56) References Cited

U.S. PATENT DOCUMENTS

| | | | |
|---|---|---|---|
| 6,168,698 B1 * | 1/2001 | Szczyrbowski et al. . | 204/298.25 |
| 7,072,883 B2 | 7/2006 | Potok et al. ....................... | 707/3 |
| 7,315,858 B2 | 1/2008 | Potok et al. ....................... | 707/6 |
| 7,693,903 B2 | 4/2010 | Potok et al. ................... | 707/737 |
| 7,805,446 B2 | 9/2010 | Potok et al. ................... | 707/737 |
| 7,937,389 B2 | 5/2011 | Jiao et al. ...................... | 707/736 |
| 8,209,288 B2 * | 6/2012 | Friedman et al. ............. | 707/638 |
| 8,493,386 B2 * | 7/2013 | Burch et al. .................. | 345/419 |
| 8,525,836 B1 * | 9/2013 | Poursohi et al. .............. | 345/428 |
| 8,577,879 B1 * | 11/2013 | Hotchkies et al. ............ | 707/732 |
| 2001/0045952 A1 * | 11/2001 | Tenev et al. ................... | 345/440 |
| 2002/0085002 A1 * | 7/2002 | Lamping et al. .............. | 345/441 |
| 2007/0018983 A1 * | 1/2007 | Vimme ......................... | 345/440 |
| 2008/0270435 A1 * | 10/2008 | Furusho ........................ | 707/101 |
| 2009/0019067 A1 * | 1/2009 | Furusho ........................ | 707/101 |
| 2012/0072665 A1 * | 3/2012 | Aprotosoaie ................. | 711/118 |

OTHER PUBLICATIONS

Patton et al., U.S. Appl. No. 61/310,351, filed Mar. 4, 2010, entitled "Method for Learning Phrase Patterns from Textual Documents," pp. 7.
Patton et al., U.S. Appl. No. 61/331,941, filed May 6, 2010, entitled "Detecting Temporal Precursor Words in Text Documents Using Wavelet Analysis," pp. 12.

\* cited by examiner

*Primary Examiner* — Jean M Corrielus
(74) *Attorney, Agent, or Firm* — Brinks Gilson & Lione

(57) ABSTRACT

A cloud computing platform includes first device having a graph or tree structure with a node which receives data. The data is processed by the node or communicated to a child node for processing. A first node in the graph or tree structure determines the reconfiguration of a portion of the graph or tree structure on a second device. The reconfiguration may include moving a second node and some or all of its descendant nodes. The second and descendant nodes may be copied to the second device.

20 Claims, 7 Drawing Sheets

CLOUD COMPUTING METHOD FOR DYNAMICALLY SCALING A PROCESS ACROSS PHYSICAL MACHINE BOUNDARIES

CROSS REFERENCES TO RELATED APPLICATIONS

1. Related Patents and Applications

This patent application makes reference to and claims priority to U.S. Provisional Patent Application Ser. No. 61/490,235, filed on May 26, 2011, entitled "Cloud Computing Method for Distributed Clustering of Textual Information," which is hereby incorporated herein by reference in its entirety.

STATEMENT REGARDING FEDERALLY FUNDED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

1. Technical Field

This disclosure relates to load balancing in a computing system and more particularly to the distribution of processing tasks and memory pressure among a plurality of hardware and software systems in a computing environment.

BRIEF SUMMARY OF THE INVENTION

A system is scaled in a cloud computing platform. A first device may comprise a graph or tree structure where one or more nodes may receive data. The data may be processed and/or stored by the node or it may be communicated to an existing child node for processing and/or storing. In some systems, the node may create a new child node within the graph or tree structure and may communicate the data to the new child node for processing and/or storing. A first node in the graph or tree structure may determine that a portion of the graph or tree structure may be moved to a second device. The portion of the graph or tree structure to be moved or reconfigured may comprise a second node and descendant nodes of the second node. The second node and corresponding descendant nodes may be transferred or copied to the second device. The first device may or may not retain the second node after it and its descendant nodes have been copied to the second device. Information and/or data may be sent by a source node in the first device, to the copy of the second node which resides on the second device. Information and/or data may be received by the source node in the first device, from the copy of the second node which resides on the second device. The source node may be the second node which resides on the first device. The source node may be a parent of the second node and may reside on the first device.

Other systems, methods, features, and advantages of the inventions will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This disclosure provides a programmatically extendable computing infrastructure where processing and/or storage of data may be dynamically scaled across physical machine boundaries. Barriers to growth imposed by fixed limits, for example, physical memory, processing capacity or speed of a given machine are thereby removed. Features of the scaling process may also be utilized to enable fault tolerance and recoverability.

Data processing and/or storage functions may be organized in a graph or tree structure which may be distributed across an unbounded number of physical machines, for example, in a cloud computing environment. A process may comprise a number of steps implemented by software and/or hardware and may, for example, utilize applications, algorithms and code. One or more processes may manipulate and/or store data within the graph or tree structure and may also control the environment on which the processes are running, based on their own needs. The processes may be operable to dynamically modify and grow the graph or tree structure beyond physical machine boundaries while continuing to perform data storage and/or data processing functions therein. The self-scaling model of the present disclosure may be internal to the processes running on the physical machines rather than on an external resource. The self-scaling processes may be aware of which resources are needed to run properly. The processes may be operable to make decisions as to the suitability of their current runtime platform, based on a current state of the algorithm being performed and may reach out to underlying cloud application programming interfaces (API) to provision additional resources as needed.

Figure 1:
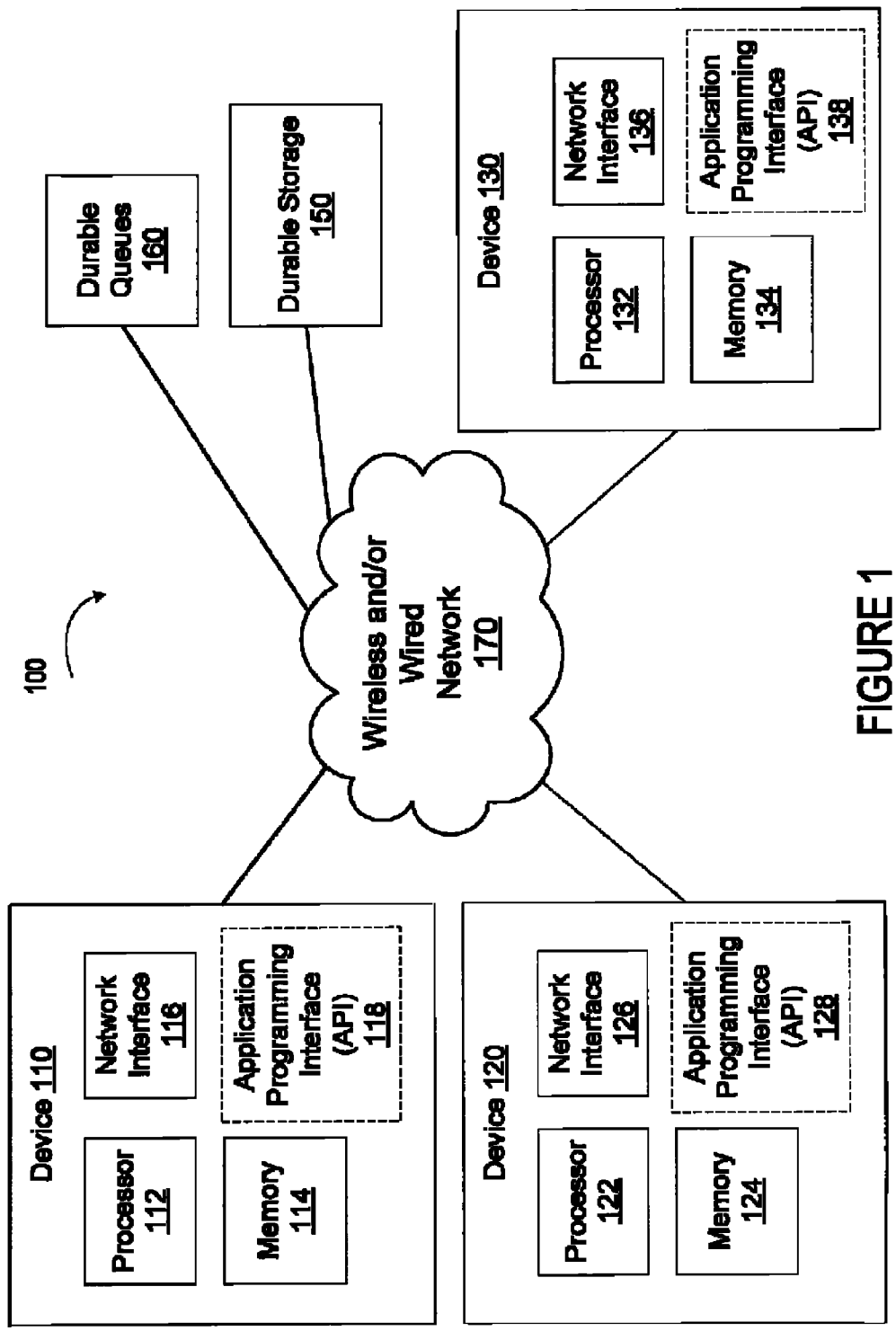
FIG. 1 is a block diagram of an exemplary computing environment.

FIG. 1 is a block diagram of an exemplary computing environment. A cloud computing platform 100 may comprise a plurality of physical machines or nodes, for example, devices 110, 120 and 130, a durable storage 150 and durable queues 160. Also, a wireless and/or wired network 170 may communicatively couple the nodes in the cloud computing platform. The device 110 may comprise a processor 112, a memory 114, a network interface 116 and an application programming interface (API) 118. The devices 120 and 130 may comprise similar components as the device 110, for example, 122, 124, 126, 128 and 132, 134, 136 and 138 shown in FIG. 1.

The devices 110, 120, 130, the durable storage 150 and the wireless and/or wired network 170 may comprise all or a portion of the cloud computing platform 100 which may be referred to as a "cloud," a "cloud computing platform" a "cloud computing environment" or a "cloud infrastructure," for example. In some instances, the cloud computing platform 100 may provide vast amounts of computing assets and storage availability to the process that modifies and grows the graph or tree structure among a plurality of physical machines and performs data storage and/or data processing functions via the graph or tree structure. In this regard, portions of the graph or tree may respectively reside on a plurality of different physical nodes or machines in the cloud computing platform 100. The cloud computing platform 100 may expose application programming interfaces (API) within the cloud environment for use by the process. The APIs may be utilized to create, delete and/or control software and/or hardware resources in the cloud computing platform 100. Some popular examples of cloud computing platforms include Amazon Web Services, Microsoft Windows Azure, and OpenStack, although the systems and processes are not limited to any specific type of cloud infrastructure.

The devices 110, 120, and 130 may be mobile or stationary devices which comprise suitable logic, circuitry, interfaces and/or code that may be operable to run virtual machines. The virtual machines may be operable to perform the described process of dynamically scaling a graph or tree across machine boundaries and performing data processing and/or storage functions utilizing the graph or tree structure.

Two or more of the devices 110, 120 and 130, the durable storage 150 and the durable queue 160 may be directly coupled and/or may be coupled via a wireless and/or wired network 170. The devices 110, 120 and 130 may each execute a series of commands representing the processes described herein. The devices 110, 120 and 130 may comprise, for example, a mainframe computer, a super computer, a personal computer, a hand-held computing and/or communication device, or any suitable computing and/or communication device.

The processors 112, 122 and 132 may comprise logic, circuitry, interfaces and/or code that may be operable to control processes and/or execute instructions in accordance with the present disclosure. The processors 112, 122 and 132 may each comprise one or more general purpose processors and/or one or more specialized processors and may be operable to support processing for one or more virtual machines. The processors 112, 122 and/or 132 may control and/or process growth of the scalable graph or tree structures and may handle data storage and/or data processing functions utilizing the graph or tree structure which may extend to and reside on a plurality of the physical machines.

The memory 114, 124 and 134 may comprise logic, circuitry, interfaces and/or executable code that may be operable to store instructions and data for tasks performed by the devices 110, 120 and 130. The memory 114, 124 and 134 may comprise any suitable storage, for example, memory cards, flash drives, solid-state devices, ROM, PROM, EPROM, EPROM or volatile memory such as RAM and DRAM. However, the disclosure is not limited to any specific type of storage medium or type of memory. The memory 114, 124 and 134 may store device and/or user profiles that may enable tuning the process of scaling a graph or tree structure beyond a physical machine boundary. All or a portion of the memory 114, 124 and 134 may be integrated within the respective devices 110, 120 and 130 or may be external to the respective devices. The memory 114, 124 and 134 may be referred to as a machine readable medium, for example.

The network interfaces 116, 126 and 136 may comprise logic, circuitry, interfaces and/or code that may enable communication among devices and storage media within the cloud computing platform 100. The network interfaces 116, 126 and 136 may communicate via any suitable network technology. They may enable communication via wide area, local area and/or personal area networks and may comprise any suitable wired and/or wireless network. The term wired network may refer to any copper or optical media. Exemplary networks may comprise the internet, a service provider network, and a private or personal network, for example. The system is not limited to any specific type of network technology or network interface and any suitable network may be utilized.

The application programming interfaces (API) 118, 128 and 138 may comprise a specification that may be used as an interface by software components to communicate with each other. The APIs 118, 128 and 138 may be defined or modified via scripts, for example, by a system administrator. Processes such as applications and code running in the devices 110, 120 and 130 may utilize the APIs 118, 128 and 138 to make calls to devices and software in the cloud computing platform 100, to request services and resources as needed for creating and scaling the graphs or trees and/or for processing data.

The durable storage 150 may comprise logic, circuitry, interfaces and/or code that may be operable to persistently store information. The durable storage 150 may reside on a separate physical device from the devices 110, 120 and 130. The durable storage may be operable to store structure and/or unstructured data. Applications, algorithms, processes or code running on the virtual machines in devices 110, 120 and 130 may store or "persist" operational states and/or data to the durable storage 150. In various systems, the persisted operational states and/or data may be utilized in instances when a device or virtual machine becomes impaired or completely out of service. Subsequently, a state and/or data may be restored or rehydrated on a different or restored device or virtual machine from the persisted state and/or data.

The durable queue 160 may comprise suitable logic, circuitry, interfaces and/or code that may be utilized to queue messages for virtual machines (VM) running in the cloud computing platform 100, for example, within the devices 110, 120 and 130. The durable queue 160 may reside on a device which is external to the devices 110, 120 and 130. The durable queue 160 may be resident in the durable storage 150 or in a separate device. When a message or data is requested or "popped" from the durable queue 160, the popped message or data may not be deleted and may be marked as hidden, for example, with a time stamp. The hidden message may be saved until it is no longer needed and may subsequently be deleted. The hidden message or data may reappear on the queue after a specified time or based on a request from a device or node in the cloud computing platform 100, for example. In this manner, if a device that requests a message and/or data from a queue undergoes a failure prior to completing a process corresponding to that message and/or data, the message and/or data may not be lost and may be retrieved again at a later time for processing. Once the process corresponding to the message or data is complete, the queue may be notified and the message and/or data may be deleted.

In operation, devices in the cloud computing platform 100 may provide a plurality of services, for example, generalized computing, durable messaging via queues, durable storage of structured and unstructured data, network connectivity and other services. The services may be interacted with, for example, provisioned, de-provisioned, or otherwise controlled, via APIs in the cloud computing environment.

Virtual machines running on one or more of the devices 110, 120 and 130 may comprise processes that may create a graph and/or tree structure and may process and/or store data in nodes of the graph or tree structure. Nodes of the graph or tree structure may be different than physical nodes in the cloud computing platform, for example, a single physical device or node in the cloud computing platform may comprise a graph or tree comprising a plurality of nodes. The graph or tree structure may comprise a root node and one or child or descendant nodes embodied on a first physical device. Processes of one or more virtual machine in the first device may scale the graph or tree so that a branch may be embodied on another physical device. Thus, if a root node is embodied on the device 110, a portion of the nodes of the graph or tree below the root node may reside on the same physical device and a portion may be scaled or graphed to one or more other devices, such as the device 120.

In various systems, a graph or tree may comprise a memory resident, non-binary tree used to model relationships among various data or documents in the cloud computing platform 100. As each set of data or document is processed by the graph or tree, the processing begins at a root node and may be further processed recursively downward either by nodes already existing in the graph or tree or by creating new child nodes. For example, when no existing nodes are available or appropriate, a node in the tree may initiate creation of a new node. Each node may be operable to ask questions of its child and/or descendant nodes in order to make decisions in processing and/or storing the data or document. These questions may be asked via the graph or tree across physical machine boundaries and the data or document may be passed to graph or tree nodes across physical machine boundaries. The software and/or hardware entities described herein may be operable process and/or store any suitable type of information or data, for example, without limitation, multimedia data, video or image data, audio data, communication data, textual data, documents and numerical data.

Figure 2:
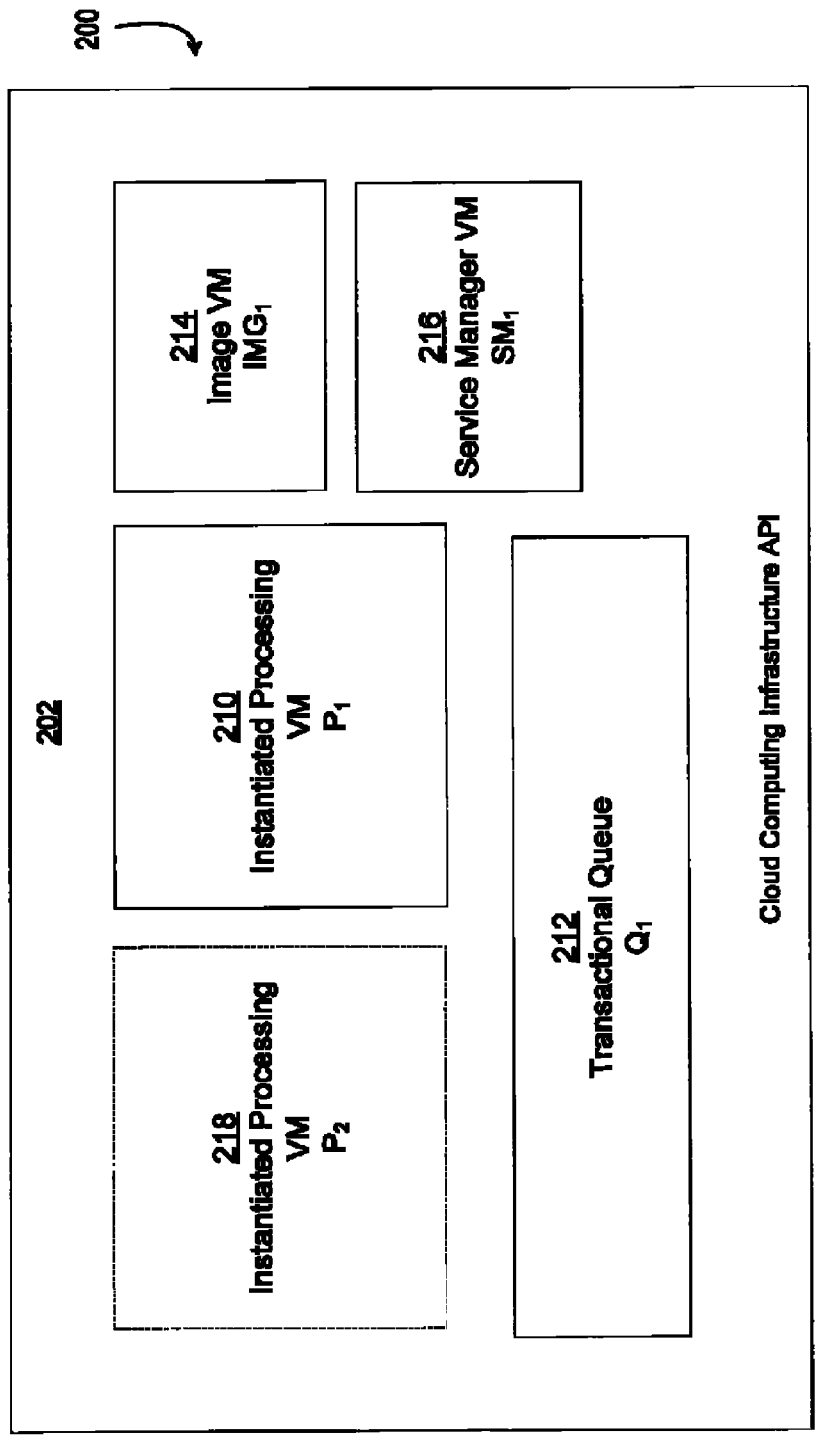
FIG. 2 is a block diagram of exemplary virtual machines that support processing data and scaling a graph or tree structure across physical machine boundaries.

FIG. 2 is a block diagram of exemplary virtual machines that support processing data and scaling a graph or tree structure across physical machine boundaries. A cloud computing environment 200, may comprise a plurality of virtual machines which may comprise a processing virtual machine (P1) 210, a transactional queue (Q1) 212, a virtual machine image (IMG1) 214 and a service manager virtual machine (SM1) 216. The virtual machines may be referred to as nodes, for example, a process node or service manager node in the cloud computing environment 200. The cloud computing environment 200 may be similar or substantially the same as the cloud computing platform 100. The cloud computing environment 200 may comprise an application programming interface (API) 202. The API 202 may be utilized for instantiating and/or controlling resources such as physical machines, virtual machines and/or processes. The API 202 may enable the scaling process described with respect to FIG. 1.

An initial state of the plurality of virtual machines may be created that comprises the processing VM P1 210, the transactional queue Q1 212, the image VM IMG1 214 and the service manager VM SM1 216.

The service manager VM SM1 216 may be created within the cloud computing platform 200 and may facilitate services for the processing VM P1 210. For example, the SM1 216 may respond to requests from the VM P1 210 indicating a need for one or more of additional processing capacity, additional storage resources, a transactional durable queue and durable storage, for example. The VM SM1 216 may manage overall service and health of one or more processing virtual machines such as P1 210 and may utilize the API 202 in this regard. The VM P1 210 may report health status to the VM SM1 216. The VM SM1 216 may reside on a separate physical machine and may receive communication via a durable queue, for example, the durable queue 150.

The image VM IMG1 214 may be created and installed with software that may process data, determine appropriate storage and/or facilitate storage of data utilizing a graph or tree structure. In an exemplary system, the VM IMG1 214 may be installed with text clustering software that may be operable to model similarity of a plurality of text documents and may cluster text documents in a graph or tree structure according to their similarity. This distributed clustering process is described in U.S. Pat. No. 7,805,446 which is incorporate herein by reference in its entirety. However, the present disclosure is not limited to a text clustering process nor is it limited to any specific processes or specific data and may perform any suitable processing and/or storage of any suitable information. Moreover, a process and/or software installed on the VM IMG1 214 may be operable to scale a graph or tree structure such that at least a portion of the graph or tree structure may reside and grow on a different physical machine and on a different virtual machine. This may occur when, for example, resources such as RAM memory and/or processing capacity become a limiting factor on a corresponding or underlying physical machine.

Software installed on the VM IMG1 214 may be instantiated on the processing virtual machine P1 210. The VM P1 210 may be operable to retrieve data or tasks and may process the tasks and/or store data, utilizing a graph or tree structure. P1 210 may also be operable to scale the graph or tree structure such that a branch of the graph or tree structure may reside and/or grow on a different physical machine and different virtual machine(s). The scaling process may begin, for example, when RAM memory or processing capacity becomes limiting on a physical machine which supports the VM P1 210. For example, the VM P1 210 may run on the device 110 shown in FIG. 1 and may utilize a graph or tree structure. When the memory 114 is utilized to a specified capacity, the system may begin branching the graph or tree structure to the device 120 such that a first portion of the tree resides on the device 110 while a second portion of the tree resides on the device 120. A new processing virtual machine P2 218 may be created on the device 120 and a portion of the graph or tree from the VM P1 210 may be copied to the device 120 and may be utilized and grown in a similar manner by the processing virtual machine P2 218.

The transactional queue (Q1) 212 may be created in the durable queue 160 and/or in the durable storage 150 illustrated in FIG. 1, for example. The Q1 212 may be loaded with a plurality of messages, tasks and/or data queued for processing by the VM P1 210. The transactional queue Q1 212 may be operable to retain tasks and/or data after they are read by P1 210. When P1 210 indicates that it has completed the task and/or processed or stored the data, Q1 212 may remove them from the queue. In instances when P1 210 fails to indicate that a task has been completed, the transactional queue may make the task and/or data available to be read again. In this regard, a timer may be set to determine when to make the information available again, although the invention is not limited with regard to how or when the information becomes available after the first pop from the queue.

During early stages of operation, the VM P1 210 may run through a plurality of steps. When the VM P1 210 starts up, it may communicate with the service manager VM SM1 216 to inform SM1 216 that it is online and ready to receive a queue assignment. Since P1 210 may be the first processing node to register with SM1 216, it may be assigned transactional Q1 212.

P1 210 may begin polling Q1 212, for example, based on regular intervals or based on a provisioned parameter. Each time the transactional queue Q1 212 is polled, it may be asked for a batch of information such as messages, tasks and/or data and may be provided with a time span during which they should be processed.

The information may be processed and assigned to various nodes throughout a graph or tree structure. If no tasks or messages are found on Q1 212 the process may sleep for a period of time prior to checking Q1 212 again.

Once all or a portion of the batch of information has been processed, the processing VM P1 210 may save a snapshot of its state to persistent storage, which may be on a different physical device, for example, the durable storage 150 shown in FIG. 1. For example, the state of P1 210 and/or its respective graph or tree may be stored in the durable storage 150. Storing the state of P1 210 in durable storage may support subsequent re-hydration of the processing VM P1 210 in instances when a failure may occur. Storing information in durable storage may be referred to as persisting the information. The frequency of persisting the state to durable storage may be controlled by a tunable parameter of the system. For example, the state of P1 210 may be persisted after each task is performed or after each item of information is processed, and/or, the state may be persisted after a plurality of tasks or items have been processed.

Subsequent to processing messages, tasks and/or data, the processing VM P1 210 may delete them from Q1 212. By waiting until the information retrieved from the transactional Q1 212 is processed before deleting it from Q1 212, the system may be able to recover from a hardware or software failure. For example, in instances when P1 210 fails during an operation, the tasks on Q1 212 may re-appear after a specified time, making them available for a new or rehydrated processing instance to read the Q1 212 and perform the processing.

The processing VM P1 210 may send the service manager VM SM1 216 information such as health status, to indicate that it is still alive and processing jobs. The information may also comprise information about consumed or available memory on the device supporting the VM P1 210.

The processing VM P1 210 may once again check the transactional queue Q1 212 for available messages, tasks and/or data and the above steps may repeat.

Figure 3:
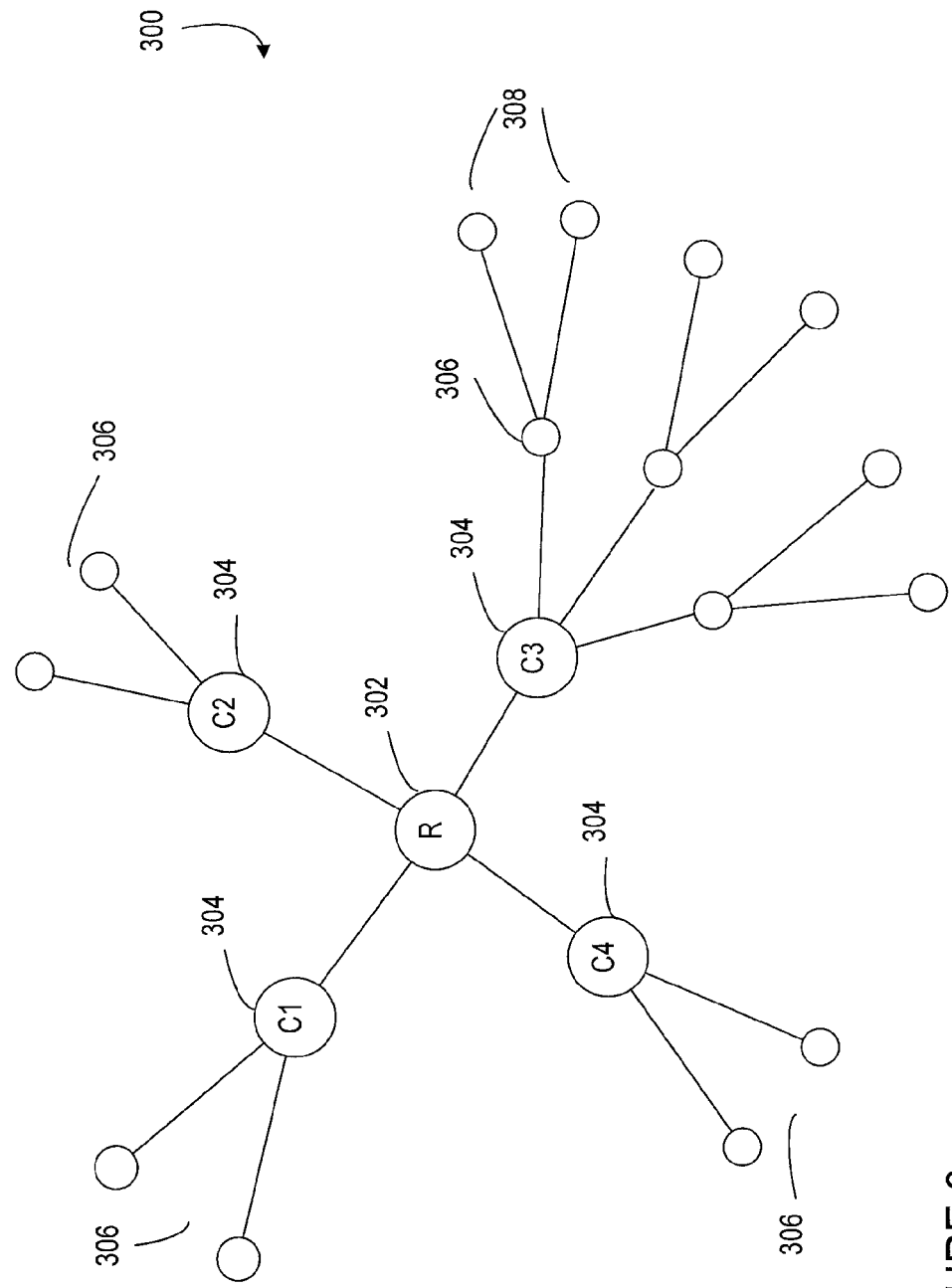
FIG. 3 is a diagram of an exemplary scalable graph or tree structure.

FIG. 3 is a diagram of an exemplary scalable graph or tree structure. Referring to FIG. 3, there is shown a graph or tree structure 300. The graph or tree structure 300 may comprise a root node (R) 302, a plurality of child nodes C1, C2, C3 and C4 at level 304 comprising the child node C3 304, a plurality of descendent nodes at level 306 and a plurality of further descendent nodes at level 308. A child node may be referred to as a descendent node. A descendent node may be a direct child node which is one level below a parent node or may be descended multiple levels below a relative parent node in a tree or graph structure.

The graph or tree structure 300 may be managed and grown by the processing virtual machine P1 210 and may reside on the same physical machine and/or memory as P1 210, for example, the device 110 and memory 114. In accordance with the early stages described with respect to FIG. 2, the graph or tree structure 300 may be built in the memory 114 by the process P1 210. As messages, tasks and/or data are received from the transactional queue Q1 212; they may be processed and/or stored by nodes in the graph or tree structure 300. As the messages and/or data are received by a node at a particular level 302, 304, 306 or 308, questions (e.g., queries) may be asked of child nodes relative to the receiving node. Responses to those questions may be utilized to make decisions with regard to which child node should receive and/or process the tasks and data. In this manner, messages, tasks and/or data may recursively progress down the graph or tree 300 until they may be processed and/or stored or may reach the bottom of the graph or tree. In some instances a new child or descendent node may be created, at any level below the root node (R) 302, to process or store the data.

The root node (R) 302 may be the first node to receive information, for example, messages, tasks and/or data from the transactional queue Q1 212. R 302 may ask questions of its child nodes at level 304 and may determine which child node should receive or process the information based on present memory capacity. The root node R 302 may forward the information to the selected child node at level 304 or may create a new child node at level 304 to receive the information. The receiving child node at level 304 may process the information or may determine that it should be forwarded to a child node of its own in level 306. The child node at level 304 may repeat the process above to select or create a node at level 306. This process may continue repeatedly down the tree until the messages, tasks and/or data are processed. As the graph or tree grows and utilizes more memory, it may exert memory pressure relative to the physical machine on which the process VM P1 210 is running and the graph or tree 300 is stored.

Figure 4:
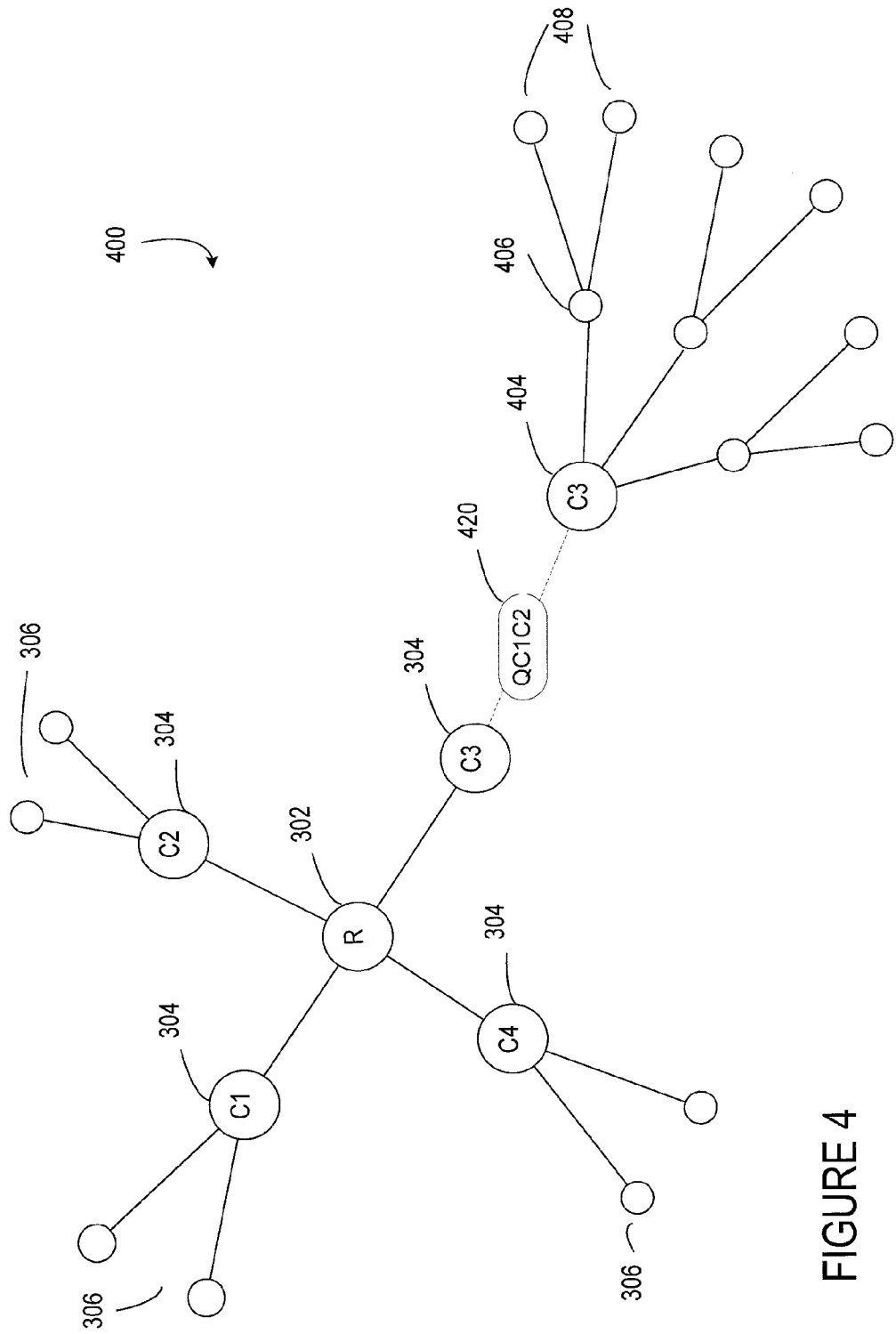
FIG. 4 is a diagram of an exemplary graph or tree structure that is scaled across a plurality of physical machines.

FIG. 4 is a diagram of an exemplary graph or tree structure that is scaled across a plurality of physical machines. FIG. 4 comprises an illustration of the graph or tree 300 after it has been scaled to reside in two physical machines, for example, the devices 110 and 120 shown in FIG. 1. In the graph or tree 400, a branch from the graph or tree 300 comprising child node C3 304 and all of C3 304's local descendant nodes from the device 110 may be copied to the physical machine 120. This copied branch may be referred to as a partial tree or a sub tree, for example. The descendant nodes below C3 304 residing on the device 110, may be pruned from the graph or tree 300, thus freeing up resources and reducing memory pressure in that physical machine, for example, the device 110. A new processing virtual machine P2 218 may be created on the device 120 and it may manage and grow the copied branch. A new queue QC1C2 420 may be assigned for communication between the child node C3 304 which may reside on device 110 and managed by the process VM P1 210 and the child node C3 404 which may reside on device 120 and managed by the process VM P2 218, for example. The child node C3 404 may function as a root node on the device 120 and may manage growth of the branch or portion of the graph or tree 400 that is stored on the device 120. The child node C3 404 may also function as a child or descendent node relative to the root node R 302 which may reside on the device 110, when it comes to processing and/or storing data. In this manner, the graph or tree 400 which comprises the root node R 302 and may span two devices and two virtual machines each residing on a different physical device, may be operable to manage growth of the portion or branches of the graph or tree 400 which resides on its own physical device while continuing to ask questions and process data of all of its descendant nodes on both physical devices 110 and 120. In some instances, the root node 302 may comprise a plurality of child nodes at level 304 all of which may branch to a different physical device. The devices 110 and 120 may be referred to as a primary device and a non-primary device respectively.

As data is processed by the graph or tree 400 via the node C3 304, the node C3 304 may store information about the data being communicated to its descendants on the second device 120. The node C3 304 may comprise a record or a summary of what is stored and/or processed by its descendent nodes in device 120. In instances when R 302 receives new data, it may be able to determine that C3 304 and/or its descendants are the appropriate nodes for receiving the data, by asking C3 304 questions. R 302 may elect C3 304 to process the data based on the information stored in C3 304. In this manner, R 302 and/or C3 304 may not need to ask questions of the second physical device 120.

The root node R 302 may comprise information regarding how many child and descendant nodes it has in total. It may know how much data or how many documents or files are stored within all of its child and descendant nodes. However, when the root node R 302 must obtain information from its descendent nodes, it may ask a question of its direct child nodes and the question may be propagated recursively down the descendant nodes in the graph or tree structure and across physical device boundaries until the information is reached in a descendant node and passed back up the tree or graph. The root node R 302 and/or any node which functions as a root node in one the devices 110, 120 and 130, for example, may know how much memory or computing resources are consumed or available in the physical device on which it resides.

The graph or tree 300 may initially be generated on a constrained amount of computing resources in the device 110 and may grow as needed to additional devices by making API calls to underlying infrastructure requesting the additional devices and/or computing resources. For example, the service manager VM SM1 216 may be called via an API and asked for additional resources and/or devices to scale the graph or tree 300.

The following steps comprise an illustrative process for scaling a graph or tree as it grows beyond what can be stored in physical memory of a primary device on which it resides. This process may be also be utilized by a virtual machine for scaling a graph or tree branch beyond physical machine boundaries of a non-primary device where the branch resides on a separate machine from its parent graph or tree node.

The process virtual machine P1 210 may be running on device 110 and may send information to the service manager virtual machine SM1 216. The information may indicate that a graph or tree scaling process may begin. The process VM P1 210 may communicate to the service manager VM SM1 216 that memory usage has reached a specified level or threshold. For example, P1 210 may indicate that 70% of available RAM from memory 114 has been consumed. SM1 216 may begin a process to scale a portion of the graph or tree 300 to a second device 120. The service manager VM SM1 216 may communicate with APIs in the cloud infrastructure 100 to instantiate a new process VM P2 218, based on the process image IMG1 214. The new process VM instance may become P2 218 and it may be instantiated on the device 120. Once P2 218 becomes online, it may begin to poll the service manager VM SM1 216 on a regular basis for a transaction queue to monitor. If none are available, the processing node P2 218 may sleep for a period of time and then may check again.

As memory utilization corresponding to the process VM P1 210 reaches a specified level or threshold, for example, 75%, it may stop processing new messages from the transactional queue Q1 212 until memory pressure is relieved.

P1 210 may evaluate the direct children of its local root node R 302 and determine which child node C1, C2, C3 or C4 at level 302 in FIG. 3, is most appropriate to be copied and pruned from the local machine. For example, R 302 may select a child node which, if copied from device 110 to another device and removed or pruned from device 110, would relieve the most memory pressure. In this regard, the child node C3 304 may be selected because it may comprise the largest branch of nodes and may represent a branch with the greatest memory pressure. However, the disclosure is not limited with regard to which child node and/or branch is selected.

The process VM P1 210 then may copy or serialize the branch comprising child node C3 304 and its descendant nodes, to durable storage 150 and a new transactional queue QC1C2 420 may be created.

The process VM P1 210 may prune descendants from its local child node C3 304 while keeping the original local child node C3 304. C3 304 may be updated to indicate that its child nodes are processed via the queue QC1C2 420. This may cause the system to send tasks to QC1C2 420 when the graph or tree structure resident on the device 120 and the process VM P2 218 is selected to process and/or store information below the child node C3 302.

The process VM P1 210 may send a health message to service manager SM1 216 indicating that it has pruned itself, and may provide a pointer to the partial tree or sub-tree resident on device 120 comprising child node C3 404. The process VM P1 210 may indicate that queue QC1C2 420 represents the communication buffer for that sub-tree.

The next time that the process VM P2 218 asks the service manager VM SM1 216 for a queue to process, it may be told to re-hydrate the copied sub-tree comprising child node C3 404 with C3 404 as its own local root node and to monitor QC1C2 420 for information such as tasks, messages or data.

From this point of the steps, the process VM P2 218 may operate in a similar fashion as the process VM P1 210, with the exception that it may monitor the queue QC1C2 420 rather than the transactional Q1 212.

The process described with respect to FIGS. 3 and 4 may continue for N processing nodes (P1 . . . PN) and each processing node (PN) may have a unique queue to monitor (QN) for its incoming tasks.

As the graph or tree develops and spans N machines, a complete picture of the graph or tree may be obtained by starting with the lowest order processing node R 302 and recursively descending down the nodes of the graph or tree, and upon reaching each new virtual machine or physical machine, asking it to provide its own view of the tree which is then appended at the appropriate point to that of its parent.

Figure 5:
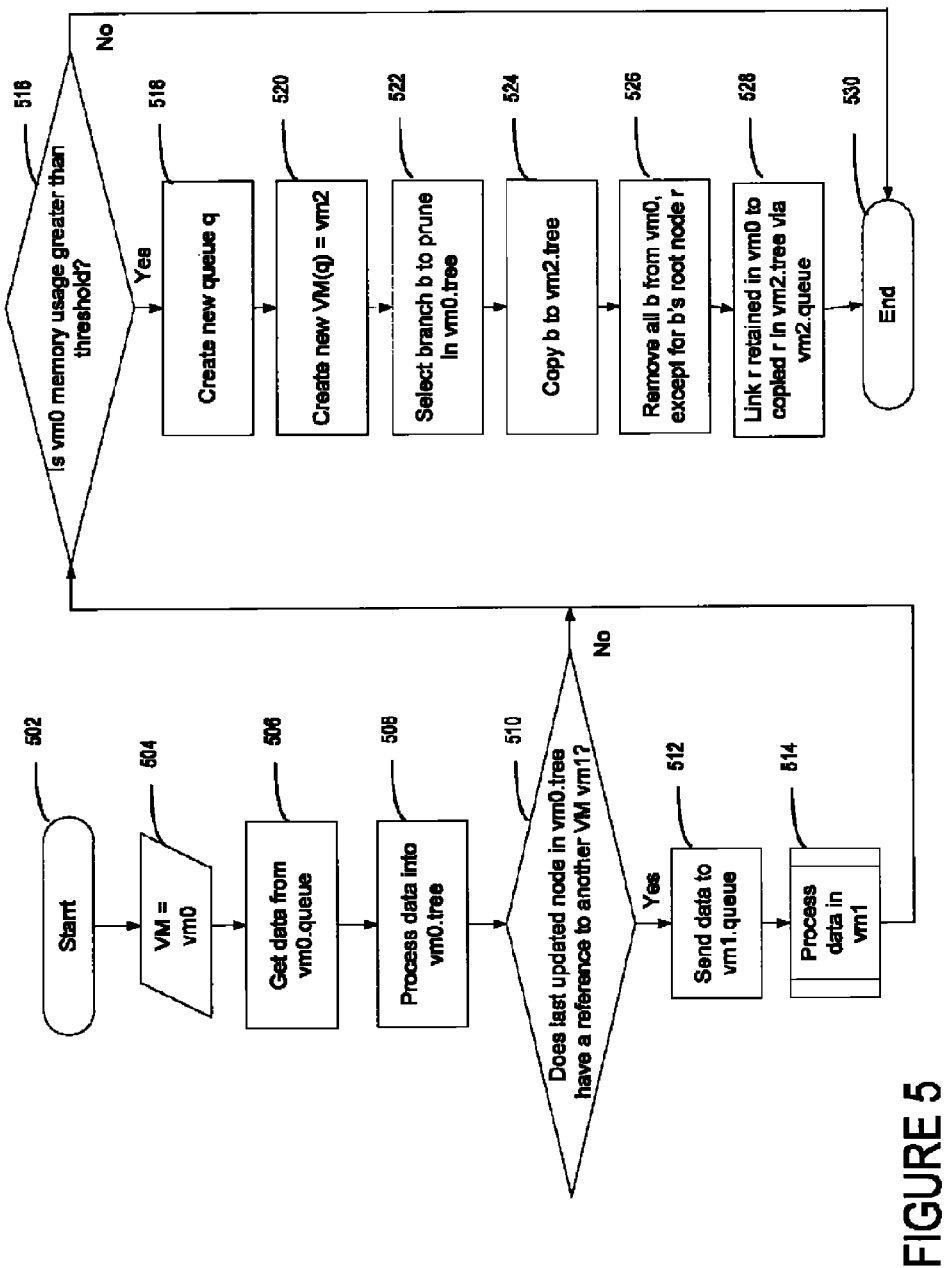
FIG. 5 is a flow chart illustrating scaling a graph or tree among a plurality of devices where processing of data and asking questions of the graph or tree descendants may continue across machine boundaries.

FIG. 5 is a flow chart illustrating general steps for scaling a graph or tree among a plurality of devices where processing of data and asking questions of the graph or tree descendants may continue across machine boundaries. The steps begin at start step 502. In step 504 a processing virtual machine VM0 may be created on a first device DEV0 from an image IMG of a processing virtual machine. In step 506, the processing virtual machine VM0 may retrieve information such as data and/or tasks to perform, from a queue VM0.QUEUE. In step 508, VM0 may process the received information recursively down a tree or sub-tree structure VM0.TREE beginning at a root node resident on the first device DEV0. In step 510, in instances when the last node reached in the first device DEV0, has a reference to another virtual machine which is a process virtual machine VM1 located in another device DEV1, the process may proceed to step 512. In step 512, the information may be sent to the process virtual machine VM1 via a queue VM1.QUEUE. In step 514, VM1 may process the information. In step 516, in instances when memory utilized by the process virtual machine VM0 is greater than a threshold the steps may proceed to step 518. In step 518, a new queue VM2.QUEUE may be created. In step 520, a new process virtual machine VM2 may be created in a separate device DEV2. VM2 may monitor and retrieve information from VM2.QUEUE. In step 522, an appropriate branch B which descends from a node N in the tree VM0.TREE may be selected for pruning. For example, in some cases, the largest branch may be selected to relieve the most memory pressure. In step 524, a branch B including a node N may be copied to the virtual machine VM2 in the device DEV2 and the copy may be referred to as VM2.tree. In step 526, the child nodes of node N in the branch B of VM0.tree of virtual machine VM0 and device DEV0 may be removed while node N may remain in VM0.tree. The node N copied to VM2.tree may function as a root node R of VM2.tree. In step 528, node N in VM0.tree may be communicatively linked to node R of VM2.tree via the queue VM2.QUEUE.

In step 510, in instances when the last reached node N in the first device DEV0, does not have a reference to another virtual machine, the process may proceed to step 516. In step 516, in instances when memory utilized by VM0 is not greater than a threshold, scaling may not be necessary at that time and the scaling process may end at step 530.

Figure 6:
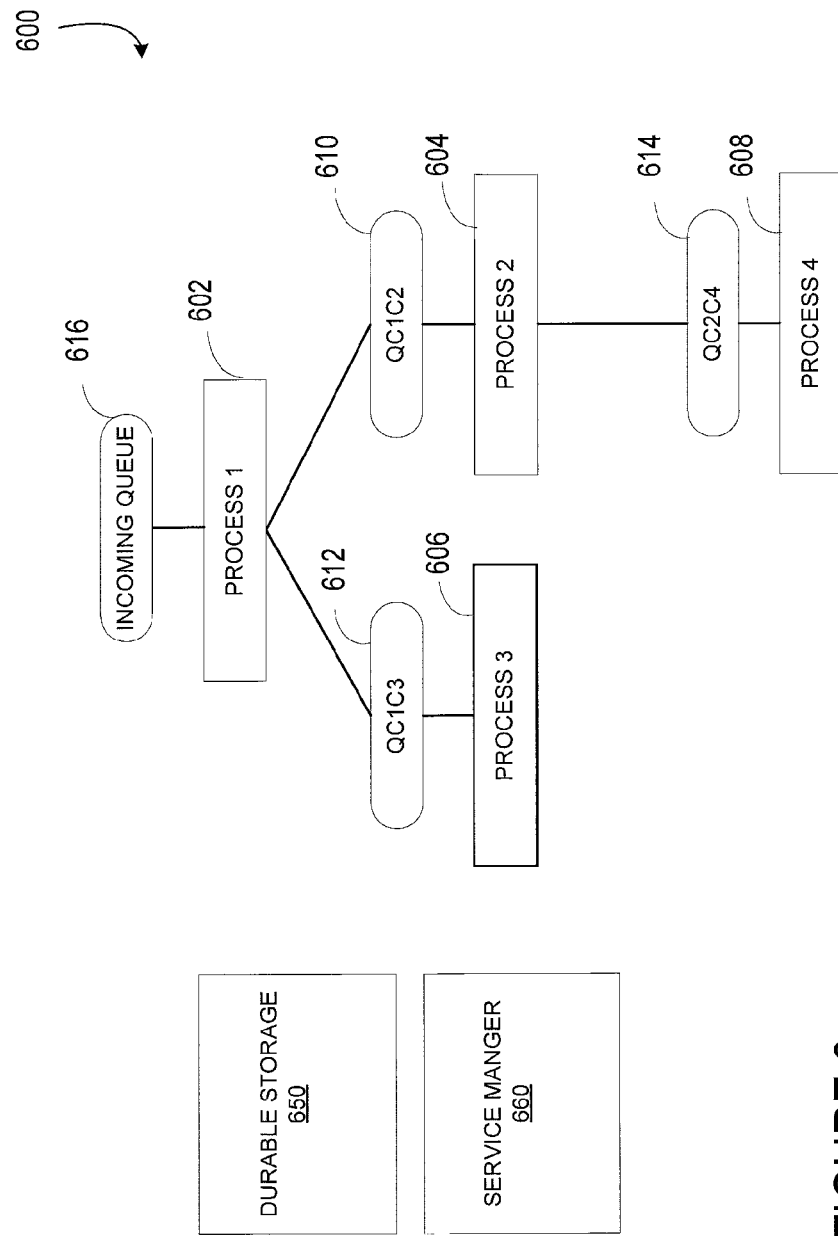
FIG. 6 is a block diagram illustrating an example of dynamically scaling a graph or tree among a plurality of physical machines while preserving the ability to ask questions via the graph or tree among the plurality of physical machines.

FIG. 6 is a block diagram which illustrates an exemplary process of dynamically scaling a graph or tree among a plurality of physical machines while preserving the ability to ask questions via the graph or tree among the plurality of physical machines. A system 600 may comprise a cloud computing platform and may comprise suitable logic, circuitry, interfaces and/or code that may be operable to scale a graph or tree across physical machine boundaries as described with respect to FIGS. 1, 2, 3, 4 and 5. Although the example described with respect to FIG. 6, refers to graph or tree nodes which are operable to process and store textual data and/or documents, the present disclosure is not limited to any specific type of processing or to any specific type of data to process or store. The graph or tree nodes may be operable to process and/or store any type of suitable information. For example, the graph or tree nodes described herein may be operable process and/or store video or image data, audio data, textual data and numerical data.

The cloud computing platform represented in FIG. 6 comprises a plurality of physical machines that run virtual machines. The virtual machines may be operable to perform the previously described graph or tree scaling operations and the data storage and processing functions via the graph or tree structures. Each of FIG. 6 elements PROCESS1 602, PROCESS2 604, PROCESS3 606 and PROCESS4 608 may refer to any of physical machines, virtual machines and processes performed by the physical and virtual machines. PROCESS1 602, PROCESS2 604, PROCESS3 606 and PROCESS4 608 may be similar or substantially the same as the any of devices 110, 120 and 130 described with respect to FIG. 1. Durable queues, QC1C2 610, QC1C3 612 and QC2C4 614, may be created to communicatively couple two or more of PROCESS1 602, PROCESS2 604, PROCESS3 606 and PROCESS4 608. These durable queues may be similar to QC1C2 420 described with respect to FIG. 4.

For the purposes of this example, we may assume that each of the physical machines or nodes in the system 600 cloud computing platform may have a limited amount of local memory. Local memory corresponding to each of PROCESS1 602, PROCESS2 604, PROCESS3 606 and PROCESS4 608, may be similar or substantially the same as the memory 114, 124 and 134 described with respect to FIG. 1. For example the memory may comprise a random access memory (RAM). Portions of the RAM memory for each machine may be dedicated to operating systems and/or to base operations of data or text processing software. Another portion of the RAM may be allocated for performing the graph or tree structure scaling functions and processing and/or storing data, such as text documents in the graph or tree structure. The graph or tree structure may be similar to the graph or tree structures 300 and 400 described with respect to FIGS. 3 and 4. Various thresholds with regard to RAM availability and/or other processing assets may be defined, that may determine when to perform a graph or tree scaling process which may extend a graph or tree structure beyond a given physical machine boundary. For example, the thresholds may be determined based on the amount of RAM utilized by the given physical machine or the amount of RAM available to the given physical machine for processing and/or storing data in its local portion of a graph or tree structure.

The cloud computing platform 600 may comprise many components which are similar or substantially the same as components described with respect to FIGS. 1, 2, 3 4 and 5. A service management node SERVICEMANAGER 660 may comprise a service manager VM similar to the service manager VM SM1 216, described with respect to FIG. 2. A transactional queue INCOMINGQUEUE 616 may be a durable queue similar to durable queue 160 described with respect to FIG. 1. The INCOMINGQUEUE 616 may be utilized for receiving incoming data and/or documents to be processed by PROCESS1 602. A separate process (not shown) may be utilized to load INCOMINGQUEUE 616 with requests to process data or documents. A persistent or durable storage DURABLESTORAGE 650 may be configured for storing unstructured data and may be similar to the durable storage 150 described with respect to FIG. 1.

Initially, PROCESS1 602 may comprise a device and one or more virtual machines which comprise data processing and/or data storage software. For example, PROCESS1 602 may comprise text clustering software and/or software for scaling graphs or trees across physical machine boundaries. When PROCESS1 602 begins running and resident software reaches a running state, it may query SERVICEMANAGER 660 to see which queue it should monitor. At this point in the process, there may be only one queue created and only one processing node alive, thus, SERVICEMANAGER 660 may respond by assigning INCOMINGQUEUE 616 to PROCESS1 602. PROCESS1 602 may then determine if INCOMINGQUEUE 616 has any information such as messages, tasks and/or data available. In instances when the information is available, PROCESS1 602 may retrieve the information. The information may comprise, for example, text documents for processing and storing in a text clustering graph or tree. PROCESS1 602 may process each of the incoming documents, and may build an initial graph or tree structure for the processing and/or for storing the documents. This graph or tree structure may be similar to the graph or tree structure 300. When the first batch of documents has been processed and/or stored in the graph or tree, PROCESS1 602 may persist its current state of the graph or tree to the DURABLESTORAGE 650. PROCESS1 602 may notify INCOMINGQUEUE 616 that the first batch of documents has been processed and any corresponding information may be purged from INCOMINGQUEUE 616's task list. PROCESS1 602 may determine how much RAM is available for processing and storing documents in the graph or tree structure. It may determine that the size of the graph or tree in local memory is very small relative to a specified threshold. For example, a warning threshold of 70% utilization may indicate to SERVICEMANAGER 660 that a scaling process may begin; however, the disclosure is not limited to any specific type of threshold or threshold value.

After the first batch has been processed, PROCESS1 602 may again receive a batch of documents from INCOMINGQUEUE 616 and, in a similar manner as the process described above, may process the second batch. PROCESS1 602 may proceed through loops of receiving and processing documents from INCOMINGQUEUE 616, adding documents to a cluster, persisting a current state to DURABLESTORAGE 650, purging tasks from INCOMINGQUEUE 616, checking memory pressure and reporting health to SERVICEMANAGER 660, until it has increased physical memory pressure in the local memory of PROCESS1 602 enough to indicate that a portion of the local graph or tree may be scaled to another physical machine. For example, 70% of the physical memory in the machine may be utilized and PROCESS1 602 may send a health status message to SERVICEMANAGER 660 indicating that memory usage is at a warning level. Once this message is sent, PROCESS1 602 may return to its loop of processing incoming documents.

When SERVICEMANAGER 660 receives a health status message with a warning threshold indicated, it may make a call to cloud APIs (not shown) in order to generate a new node, PROCESS2 604. The text clustering software and/or the graph or tree scaling software may be installed in PROCESS2 604. SERVICEMANAGER 660 may begin waiting for notification that PROCESS2 604 is coming online and/or ready to process tasks.

Meanwhile, PROCESS1 602 may continue to process documents, persist state to durable storage, clearing the jobs from the transactional queue, and reporting health status. Each time it sends a health message to SERVICEMANAGER 660 it may receive a response that the new node is not yet available and that it should continue its processing in its loop. This looping process may repeat until such point that PROCESS2 604 is available or PROCESS1 602 reaches a specified memory utilization at which point it may pause operations until PROCESS2 604 is available.

When PROCESS2 604 is online and its software has reached a running state, it may communicate with SERVICEMANAGER 660 and may ask which queue it should monitor for incoming documents. Since SERVICEMANAGER 660 may create a queue to buffer communications between PROCESS1 602 and PROCESS2 604 it may reply with the name of a newly created queue, QC1C2 610.

The next time that PROCESS1 602 sends a health message to SERVICEMANAGER 660, a reply may indicate that a new node is available and should be utilized. At this point PROCESS1 602 may ask its root node of its local graph or tree to evaluate each of its first level child nodes and inquire as to which branch is most appropriate for pruning. For example, the most appropriate branch may be the largest branch. However, the disclosure in not limited in this regard. For example, referring to FIGS. 3 and 4, one may assume that there is a root node R 302 and four direct child nodes C1 304, C2 304, C3 304 and C4 304 residing on PROCESS1 602. Child node C3 304 may be the largest branch representing the largest portion of RAM utilization. PROCESS1 602 may elect to prune the descendant nodes of node C3 304. PROCESS1 602 may serialize node C3 304 and its descendant nodes and may ask PROCESS2 604 to instantiate a local graph or tree based on the serialized data. PROCESS2 604 may perform instantiation of the branch comprising C3 304 and its descendants as node C3 404 and its descendant nodes shown in FIG. 4. PROCESS2 604 may persist itself to DURABLESTORAGE 650 in order to store its initial state for recovery purposes. PROCESS2 604 may communicate to PROCESS1 602 and/or to SERVICEMANAGER 660 indicating that the instantiation and/or persisting of state processes were successful. PROCESS1 602 may then prune the local branch of C3 304 by retaining the node C3 304 and removing all levels of C3 304's local descendent nodes as shown in FIG. 4. A flag may be set, for example, in the node C3 304 to indicate that its descendant nodes are now on a remote physical machine and that communication with them is buffered via the queue QC1C2 610.

In an alternative method, the method may be similar to the one described above except that instead of retaining the node C3 304 in PROCESS1 602, the entire branch including the node C3 304 and its descendants may be removed from PROCESS1 602 rather than only the descendant nodes of C3 304. In this method, the root node R 302 may be communicatively coupled directly to C3 404 via the durable queue QC1C2 610. The root node R 302 may ask questions and/or forward processing tasks and/or data to its child node C3 404 directly via the durable queue QC1C2 610.

As described with respect to FIG. 6, there are two physical machines comprising PROCESS1 602 and PROCESS2 604 and the graph or tree 400 is split across them with their internode communication buffered via QC1C2 610. Child node C3 may exist on both physical machines. On PROCESS1 602 it is referred to as the node C3 304 with no children but having a flag indicating that its children are located on a remote machine. On PROCESS2 604, C3 may be a root node referred to as C3 404.

By splitting the graph or tree 400 across two physical machines in this manner a large portion of RAM on PROCESS1 602 may become available for new graph or tree growth from its own portion of the graph or tree 400. PROCESS1 602 may continue its task of processing batches documents or data from INCOMINGQUEUE 616 and PROCESS2 604 may begin processing items from QC1C2 610.

In the course of operations, PROCESS1 602 may add a document to the graph or tree 400, for which root node R 302 may determine that C3 304 is the appropriate target child node. Child node C3 304 may add the document to its local information, for example, it may record a summary of the document or a vector of information pertaining to the document. C3 304 may attempt to pass the document to one of its child nodes for processing and/or storing. C3 304 may determine that its child nodes are remote and that communication to them is handled via QC1C2 610. A message may be sent to QC1C2 610 representing the document. In some examples, from the perspective of PROCESS1 602 the document may now be fully processed.

The PROCESS2 604 may see a job in QC1C2 610 and may process the job through its local sub-tree comprising local root node C3 404, in the same manner as described above and in the manner root node R 302 in PROCESS1 602 would. Both copies of C3, C3 304 and C3 404, may process the document and add its information to their local vector or local information. This redundant computation in both versions of C3 may be considered a worthwhile tradeoff given the ability to minimize the required communications across physical machine boundaries by the present method.

This state of operation may continue until one of the machines reaches a specified threshold for memory utilization, at which point the health management and tree splitting stages may occur again. For example, as shown in FIG. 6, PROCESS1 602 may spawn PROCESS3 606 and QC1C3 612 by the methods described above and PROCESS2 604 may spawn PROCESS4 608 and QC2C4 608 by the methods described above. Each process in the distributed graph or tree may in turn utilize the methods described above to spawn new processes and scale a portion of the graph or tree to new physical devices.

Figure 7:
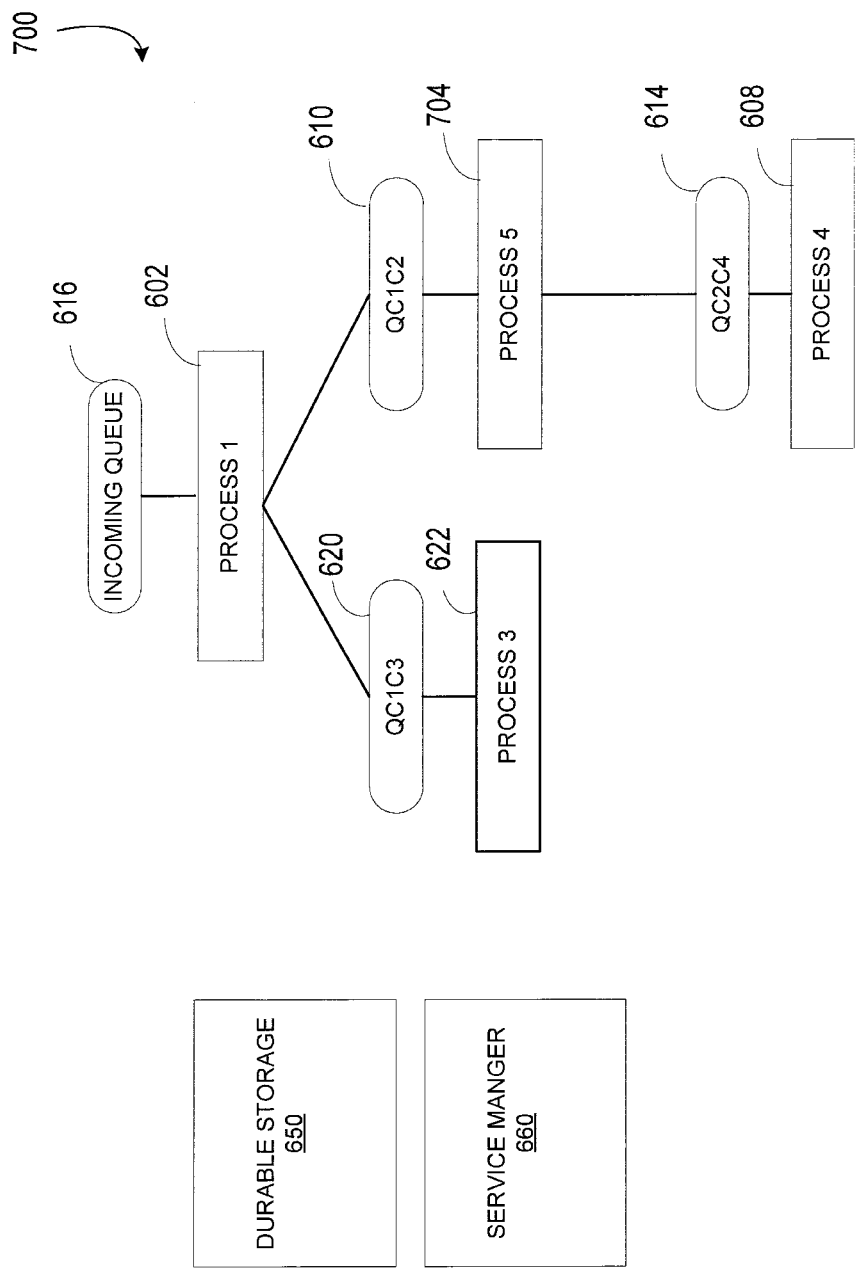
FIG. 7 is a block diagram illustrating an exemplary recovered state after a fault recovery process in physical machines comprising a graph or tree structure scaled across physical machine boundaries.

FIG. 7 is a block diagram illustrating an exemplary recovery state after a fault recovery process in physical machines comprising a graph or tree structure scaled among a plurality of physical machines. An illustrative example of a fault recover process may be based on the system 600 as described and shown with respect to FIG. 6. The system 700 shown in FIG. 7 represents what the system 600 may look like after a fault recovery.

During the processing of a particular batch of data or documents, the node named PROCESS2 604 in FIG. 6, may experience a hardware failure. QC1C2 610 may continue to accumulate tasks. SERVICEMANAGER 660 may determine that a health message from PROCESS2 604 is overdue and within a specified period of time, may make a call to PROCESS2 604 to see if it is still alive and/or functioning. In instances when the call fails, SERVICEMANAGER 660 may begin a recovery process depending on the type of cloud platform being utilized in system 600. Various cloud computing platforms may have their own health monitoring substructure, for example, with guaranteed service level agreements (SLA) for recovery of failed nodes while others may expect local code to manage the health of local nodes. In the former case, SERVICEMANAGER 660 may simply wait for a new processing node to be instantiated and come online and contact SERVICEMANAGER 660 for a queue to process. In the latter case, the SERVICEMANAGER 660 may make a call to the cloud infrastructure APIs in system 600 to trigger the instantiation of a new processing node. In either case, the new processing node may comprise a PROCESS5 704, shown in FIG. 7.

When PROCESS5 704 comes online, it may contact SERVICEMANAGER 660 for a queue to process. However, PROCESS5 704 may be instructed to build a local tree from DURABLESTORAGE 650, based on a most recent saved state from the now failed PROCESS2 604. PROCESS5 704 may rehydrate the most recently persisted state of PROCESS2 604 and may then persist its own initial state to DURABLESTORAGE 650, for example. PROCESS5 704 may begin processing tasks from QC1C2 610 as defined by the state restored from PROCESS2 604. While overall operations may be delayed during this recovery process, data may not be lost. Also, portions of the graph or tree above PROCESS2 604 may not be not be affected by any delay and may continue to process incoming information and/or documents normally. The recovered scaled graph or tree environment is represented by FIG. 7.

Tasks that may have been popped from QCQC2 610 by PROCESS2 604, but were not processed or not fully processed by PROCESS2 604 prior to occurrence of the fault, may not have been lost. If PROCESS2 604 did not delete the tasks from the durable queue QC1C2 610 because it was waiting to complete the tasks first, the durable queue QC1C2 610 may assume that they were not processed successfully and may make those tasks available again for PROCESS5 704 to view or pop from the queue.

In the description and examples provided in this document we have demonstrated a system in a cloud computing platform that may be utilized for processing information among a plurality of physical machines without imposed limits on the number of compute resources utilized. The process virtual machines described herein enable control of an environment on which they are running and adaption to the environment, based on their own needs. Finally, we have demonstrated how the processes may utilize core features of a cloud environment to support fault tolerance and recoverability.

The devices described may execute software encoded in a non-transitory signal bearing medium, or may reside in a memory resident to or interfaced to one or more processors or controllers that may support a tangible communication interface, wireless communication interface, or a wireless system. The memory may include an ordered listing of executable instructions for implementing logical functions. A logical function may be implemented through digital circuitry, through source code, or through analog circuitry. The software may be embodied in any computer-readable medium or signal-bearing medium, for use by, or in connection with an instruction executable system, apparatus, and device, resident to system that may maintain a persistent or non-persistent connection with a destination. Such a system may include a computer-based system, a processor-containing system, or another system that includes an input and output interface that may communicate with a publicly accessible distributed network through a wireless or tangible communication bus through a public and/or proprietary protocol.

A "computer-readable medium," "machine-readable medium," "propagated-signal" medium, and/or "signal-bearing medium" may comprise a medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The term network may refer to any wide area, local area and/or personal area network which utilizes any wired or wireless technology for communication. The term wired network may refer to copper or optical media, for example. Exemplary networks may comprise the internet, a service provider network and a private or personal network.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "position," "location," or "point" may encompass a range of positions, locations, or points. The term "substantially" or "about" may encompass a range that is largely, but not necessarily wholly, that which is specified. It encompasses all but a significant amount.

Other systems, methods, features and advantages will be, or will become, apparent to one with skill in the art upon examination of the figures and detailed description. It is intended that all such additional systems, methods, features and advantages be included within this description, be within the scope of the invention, and be protected by the following claims.

We claim:

1. A method for scaling a process in a cloud computing platform, the method comprising:
   in a first device comprising a graph or tree structure wherein one or more nodes in said graph or tree structure are operable to receive data and one or more of:
   process and store said data;
   create a new child node in said graph or tree structure; and
   communicate said data to said new child node or to an existing child node in said graph or tree structure for said processing and storing said data;
   determining by a first node in said graph or tree structure, based on information about memory usage or computing resources, when to move a portion of said graph or tree structure to a second device, wherein said portion of said graph or tree structure comprises a second node and descendant nodes of said second node;
   copying said portion of said graph or tree structure to said second device; and
   sending or receiving information by a source node of said graph or tree structure which resides on said first device to or from said copy of said second node which resides on said second device;
   wherein said source node comprises said second node which resides on said first device or a parent of said second node which resides on said first device.

2. The method according to claim 1, wherein a durable queue is assigned for handling said sending or receiving of said information by said source node which resides on said first device to or from said copy of said second node residing on said second device.

3. The method according to claim 2, wherein growth of said graph or tree structure includes said creating said new child node in said graph or tree structure and moving said portion of said graph or tree structure to a second device, and management and said growth of said graph or tree structure is performed by a process virtual machine running in said first device.

4. The method according to claim 3, comprising one or both of:
   procuring services for said management and said growth of said graph or tree structure via an application programming interface; and
   communicating with an application programming interface in said cloud computing platform to instantiate or control external hardware or software resources.

5. The method according to claim 3, comprising persisting a current state of said virtual machine or said graph or tree structure to durable storage.

6. The method according to claim 5, wherein at least a portion of said graph or tree structure is recovered after a fault in said first device by rehydrating said persisted current state of said virtual machine or said graph or tree structure.

7. The method according to claim 6, wherein one or more unfinished tasks or data which persists in said durable queue is retrieved by said recovered at least a portion of said graph or tree structure and processed by said recovered at least a portion of said graph or tree structure.

8. The method according to claim 1, comprising setting a flag within said source node which resides on said first device to enable communication with said copy of said second node which resides on said second device.

9. The method according to claim 1, comprising removing descendent nodes of said source node which reside on said first device, from said first device.

10. The method according to claim 1, wherein said determining by said first node in said graph or tree structure, when to move said portion of said graph or tree structure to said second device is based on limitations in computing resources available to said first device.

11. A system for scaling a process in a cloud computing platform, the system comprising:
    one or more hardware processors for use in a first device, said one or more hardware processors comprising a graph or tree structure, said one or more hardware processors are operable to:
    receive data in one or more nodes of said graph or tree structure and one or more of:
    process and store said data;
    create a new child node in said graph or tree structure; and
    communicate said data to said new child node or to an existing child node in said graph or tree structure for said processing and storing said data;
    determine by a first node in said graph or tree structure, based on information about memory usage or computing resources, when to move a portion of said graph or tree structure to a second device, wherein said portion of said graph or tree structure comprises a second node and descendant nodes of said second node;
    copy said portion of said graph or tree structure to said second device; and
    send or receive information by a source node of said graph or tree structure which resides on said first device to or from said copy of said second node which resides on said second device;
    wherein said source node comprises said second node which resides on said first device or a parent of said second node which resides on said first device.

12. The system according to claim 11, wherein a durable queue is assigned for handling said sending or receiving of said information by said source node which resides on said first device to or from said copy of said second node residing on said second device.

13. The system according to claim 12, wherein growth of said graph or tree structure includes said creating said new child node in said graph or tree structure and said moving said portion of said graph or tree structure to a second device and said one or more hardware processors are operable to manage and grow said graph or tree structure by a process virtual machine running in said first device.

14. The system according to claim 13, wherein said one or more hardware processors are operable to one or both of:
    procure services for said management and growth of said graph or tree structure via an application programming interface; and
    communicate with an application programming interface in said cloud computing platform to instantiate or control external hardware or software resources.

15. The system according to claim 13, wherein said one or more hardware processors are operable to persist a current state of said virtual machine or said graph or tree structure to durable storage.

16. The system according to claim 15, wherein at least a portion of said graph or tree structure is recovered after a fault in said first device by rehydrating said persisted current state of said virtual machine or said generated graph or tree structure.

17. The system according to claim 16, wherein one or more unfinished tasks or data which persists in said durable queue is retrieved by said recovered at least a portion of said graph or tree structure and processed by said recovered at least a portion of said graph or tree structure.

18. The system according to claim 11, wherein said one or more hardware processors are operable to set a flag within said source node which resides on said first device to enable communication with said copy of said second node which resides on said second device.

19. The system according to claim 11, wherein said one or more hardware processors are operable to remove descendent nodes of said source node which reside on said first device, from said first device.

20. The system according to claim 11, wherein said determining by said first node in said graph or tree structure, when to move said portion of said graph or tree structure to said second device is based on limitations in computing resources available to said first device.

* * * * *